(12) United States Patent
Bono et al.

(10) Patent No.: US 8,590,417 B1
(45) Date of Patent: Nov. 26, 2013

(54) TRAILER LANDING GEAR APPARATUS

(76) Inventors: James G. Bono, Corona, CA (US); Mike N. K. Chen, Irvine, CA (US)

(*) Notice: Subject to any disclaimer, the term of this patent is extended or adjusted under 35 U.S.C. 154(b) by 66 days.

(21) Appl. No.: 12/928,491

(22) Filed: Dec. 13, 2010

(51) Int. Cl.
*G05F 1/00* (2006.01)
*G05G 1/08* (2006.01)

(52) U.S. Cl.
CPC ........................ *G05G 1/085* (2013.01)
USPC .............. 74/545; 74/543; 74/548; 280/766.1; 280/764.1; 280/763.1; 254/419

(58) Field of Classification Search
USPC ..................... 280/6.153, 763.1, 764.1, 766.1; 254/419, 423; 74/545, 548
IPC ................................................. B60S 9/02,9/04
See application file for complete search history.

(56) References Cited

U.S. PATENT DOCUMENTS

| | | | |
|---|---|---|---|
| 3,182,956 A * | 5/1965 | Dalton | 254/419 |
| 3,490,547 A | 1/1970 | Stewart | |
| 4,345,779 A * | 8/1982 | Busby | 280/766.1 |
| 4,466,637 A | 8/1984 | Nelson | |
| 5,538,225 A * | 7/1996 | VanDenberg | 254/419 |
| 5,865,499 A | 2/1999 | Keyser | |
| 5,904,342 A * | 5/1999 | Laarman | 254/419 |
| 5,911,437 A * | 6/1999 | Lawrence | 280/766.1 |
| 6,010,154 A | 1/2000 | Payne | |
| 6,039,126 A | 3/2000 | Hsieh | |
| 6,086,099 A * | 7/2000 | Kingsbury | 280/766.1 |
| 6,218,746 B1 | 4/2001 | Gouge | |
| 2004/0080125 A1 * | 4/2004 | Bird et al. | 280/6.153 |
| 2005/0073130 A1 | 4/2005 | McGlothlin | |
| 2006/0119089 A1 * | 6/2006 | Rivers et al. | 280/763.1 |

FOREIGN PATENT DOCUMENTS

EP 513973 A2 * 11/1992
JP 2000289477 A * 10/2000

* cited by examiner

*Primary Examiner* — Vinh Luong
*Assistant Examiner* — William Santosa
(74) *Attorney, Agent, or Firm* — Dennis W. Beech

(57) ABSTRACT

The trailer landing gear apparatus may be used for rotating a drive shaft of a landing gear or lifting gear of a land vehicle. There may be a drive shaft connector that may be attachable to a trailer drive shaft, A drive gear apparatus may be mounted on a rotary drive apparatus and a drive apparatus connector may be attached to a drive socket of the drive gear apparatus. The drive shaft may be rotated by positioning the drive apparatus connector on a connector shaft of the drive shaft connector. The rotary drive apparatus may then be operated to rotate the gear elements of the drive gear apparatus to rotate the drive shaft connector. The drive shaft connector may also have a hand crank handle attached to a sleeve for alternate use in drive shaft rotation.

6 Claims, 8 Drawing Sheets

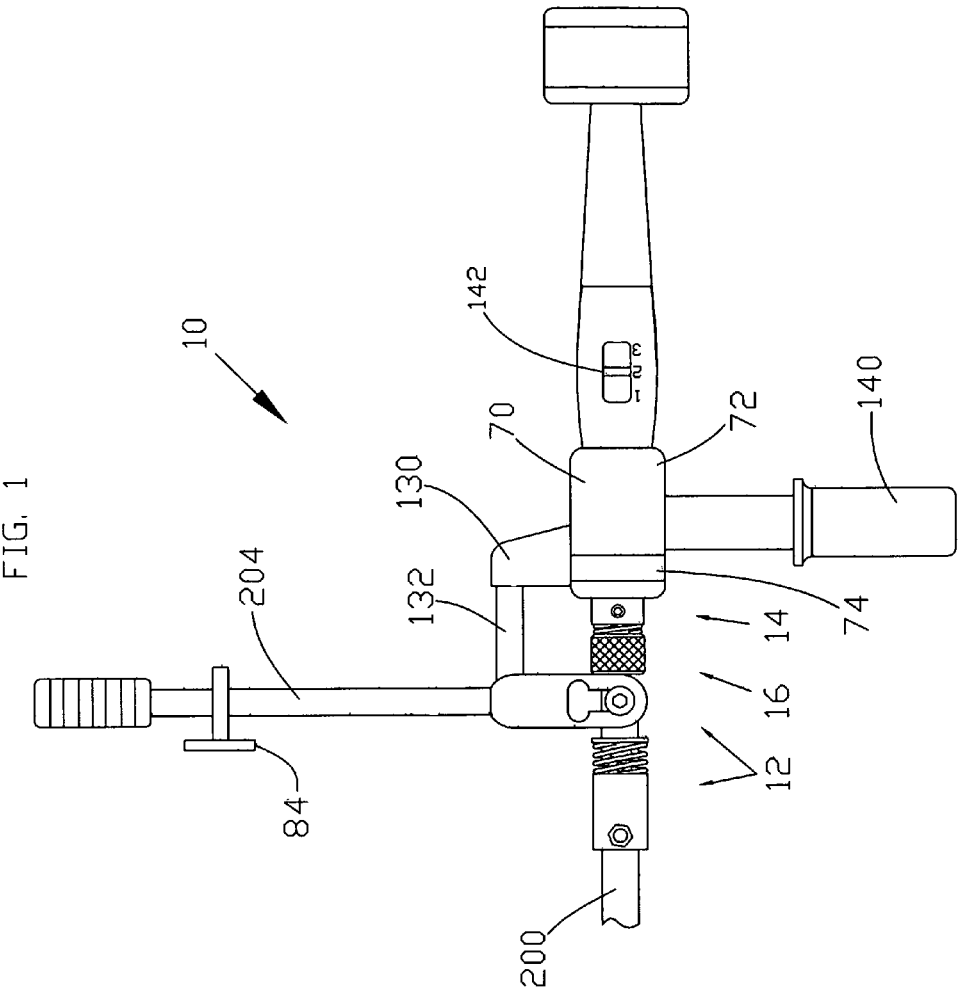
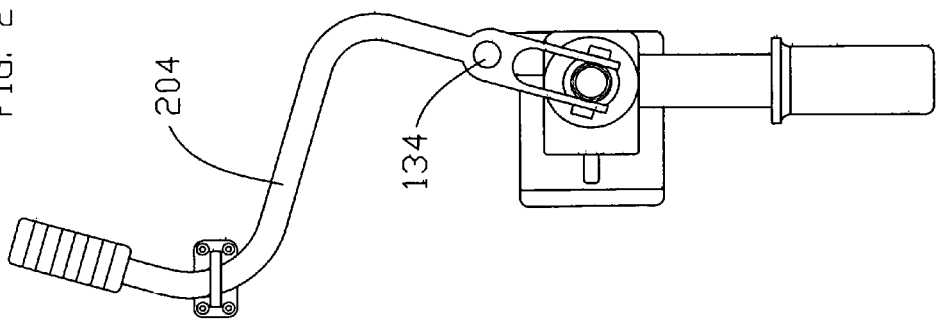

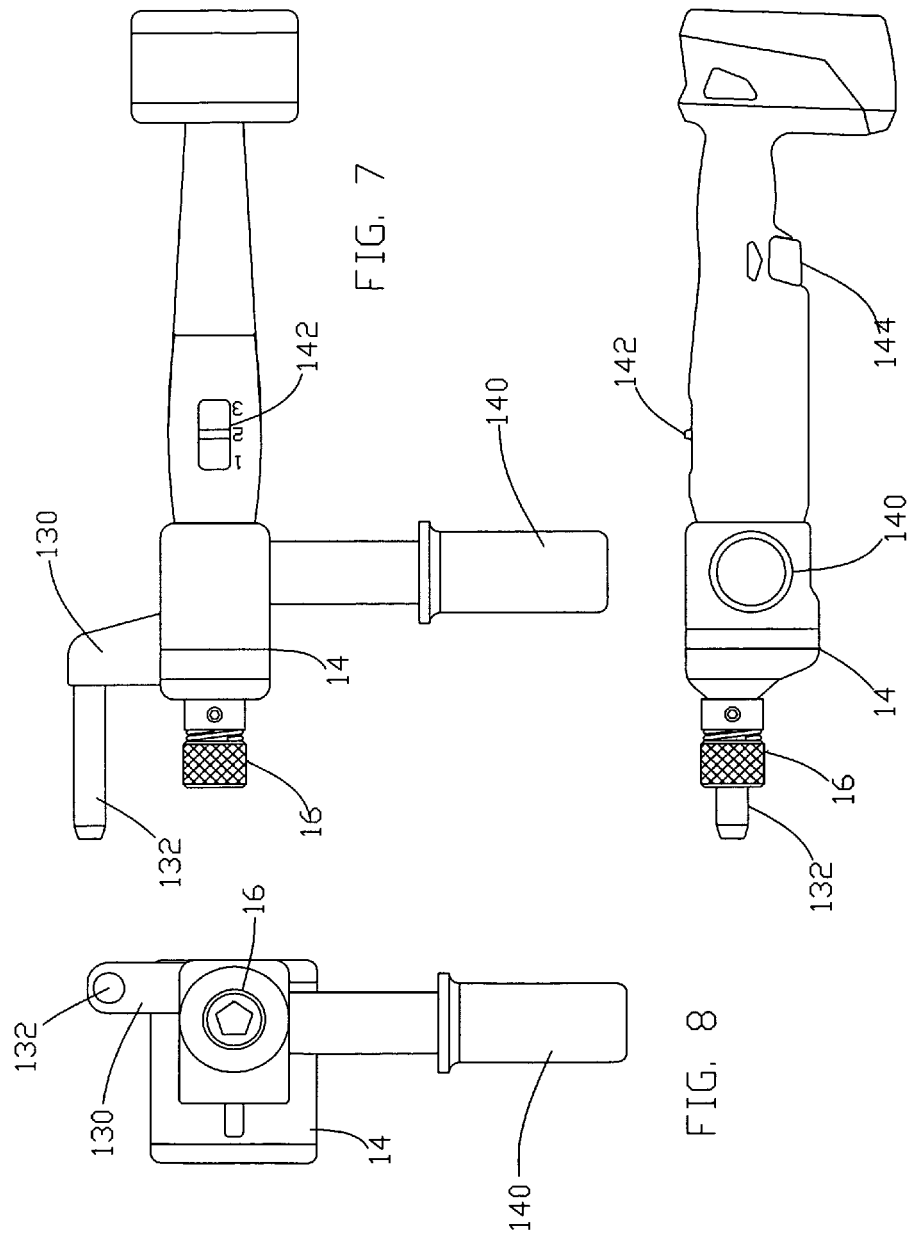

US 8,590,417 B1

TRAILER LANDING GEAR APPARATUS

BACKGROUND OF THE INVENTION

This invention relates to apparatus and devices for coupling or engaging the drive shaft of a trailer landing gear, lifting gear, dolly or the like mechanism for use in raising and lowering the legs or supports of the mechanism.

The new apparatus may use a combination of a drive shaft connector and a drive gear apparatus for engagement of a rotary drive apparatus to rotate a drive shaft or landing gear drive mechanism.

Various trailer apparatus, devices and methods may be known for use with or engagement of trailer landing gear. Such apparatus may include attachment of drive units that have one or more shafts and gear assemblies or gear boxes to the drive shaft of a landing gear. These types of drive units may allow attachment of a hand crank handle on one shaft end or a rotary motor on a second shaft end to rotate the landing gear drive shaft. This type of system requires addition of the drive unit to each trailer on which it is desired to practice the method of operating the landing gear and may require storage of a hand crank handle separate from the drive unit.

Other devices may include simple adapters that may be attached to a rotary drive apparatus such as a hand held drill motor. This type of adapter may have a coupling means at one end to engage a trailer landing gear drive shaft or gear drive mechanism in the same way as a hand crank handle would be used to raise or lower the legs or supports. For this type of adapter a powered rotary apparatus must normally be specially designed to provide the proper torque power to operate a trailer landing gear. Also, the hand crank handle must be removed to allow use of the rotary powered apparatus.

SUMMARY OF THE INVENTION

The present invention is directed to apparatus for rotating a drive shaft of a landing gear or lifting gear of a land vehicle. There may be a drive shaft connector that may be attachable to a trailer drive shaft. A drive gear apparatus may be mounted on a rotary drive apparatus and a drive apparatus connector may be attached to a drive socket of the drive gear apparatus. The drive shaft may be rotated by positioning the drive apparatus connector on a connector shaft of the drive shaft connector. The rotary drive apparatus may then be operated to rotate the gear elements of the drive gear apparatus to rotate the drive shaft connector. The drive shaft connector may also have a hand crank handle attached to a sleeve for alternate use in drive shaft rotation.

These and other features, aspects and advantages of the present invention will become better understood with reference to the following drawings, description and claims.

BRIEF DESCRIPTION OF THE DRAWINGS

FIG. 1 illustrates a side view of a landing gear apparatus with the drive apparatus with a trailer drive shaft engaged with a trailer drive shaft according to an embodiment of the invention;

FIG. 2 illustrates a drive end view of a landing gear apparatus with the drive apparatus engaged according to an embodiment of the invention;

FIG. 7 illustrates a side view of a rotary drive apparatus according to an embodiment of the invention;

FIG. 8 illustrates a drive end view of a rotary drive apparatus according to an embodiment of the invention;

FIG. 9 illustrates a side view of a rotary drive apparatus according to an embodiment of the invention;

DETAILED DESCRIPTION

Figure 3:
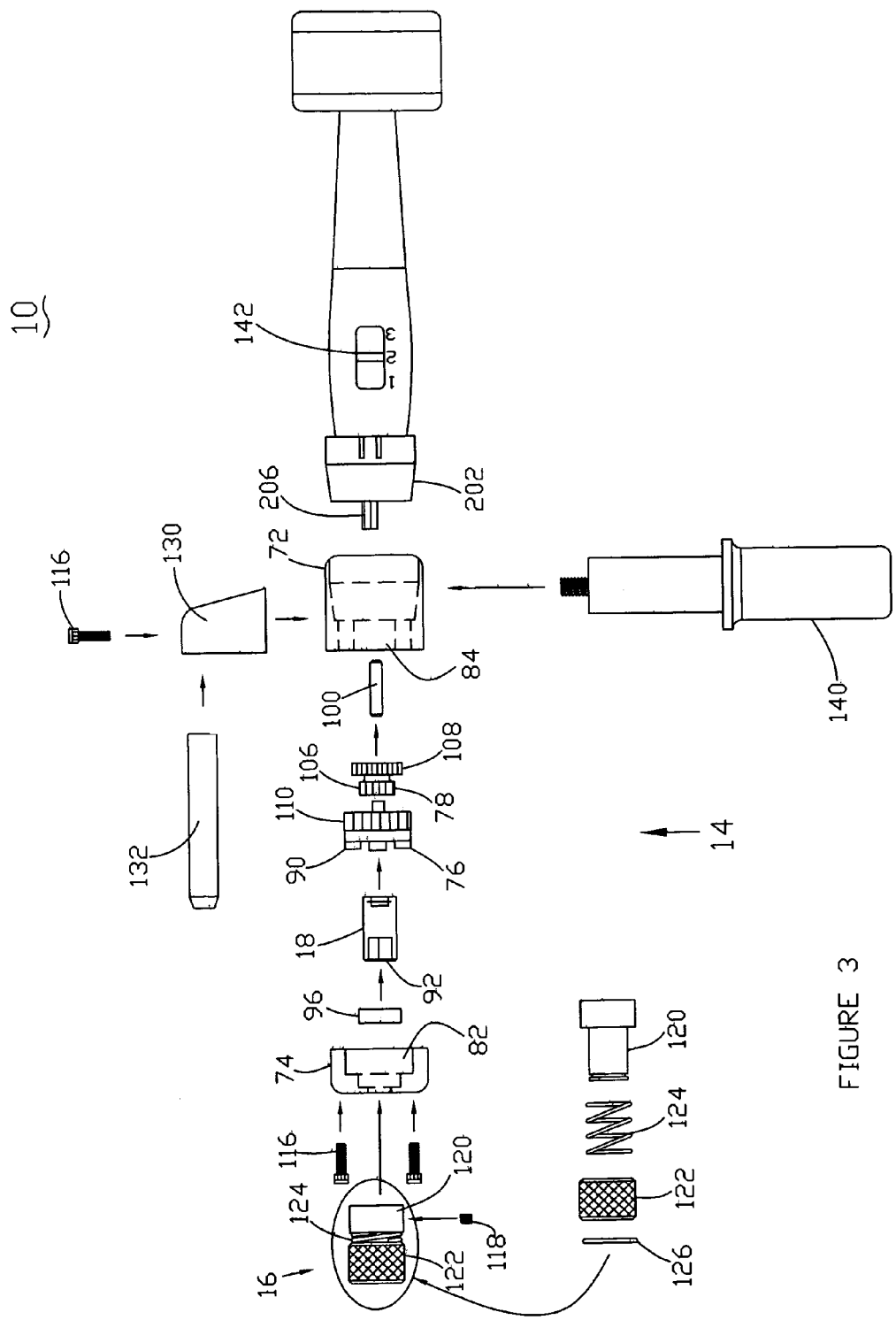
FIG. 3 illustrates an exploded side view of a drive gear apparatus and a rotary drive apparatus according to an embodiment of the invention.
Figure 4:
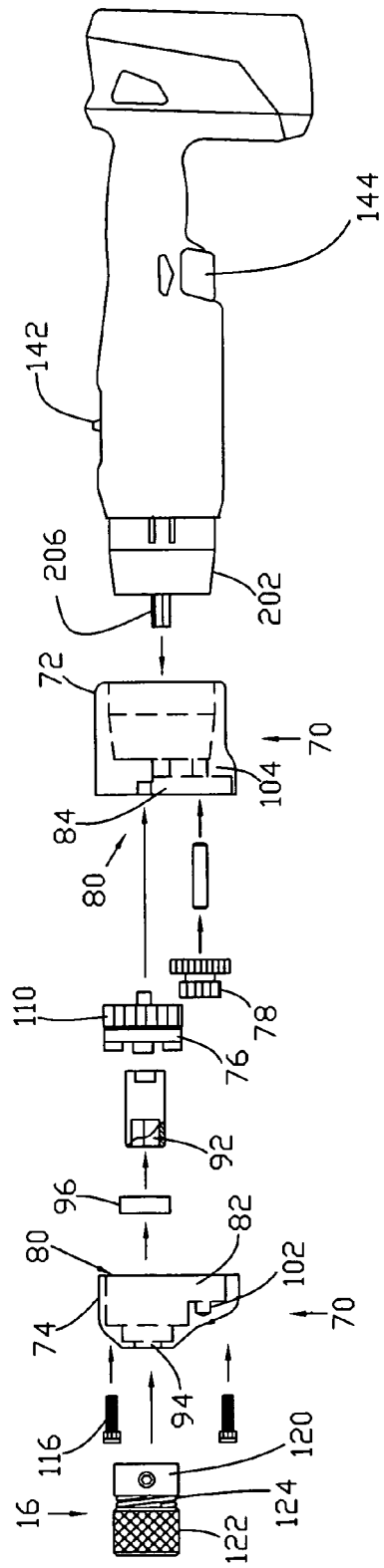
FIG. 4 illustrates an exploded side view of a drive gear apparatus and a rotary drive apparatus according to an embodiment of the invention.
Figure 6:
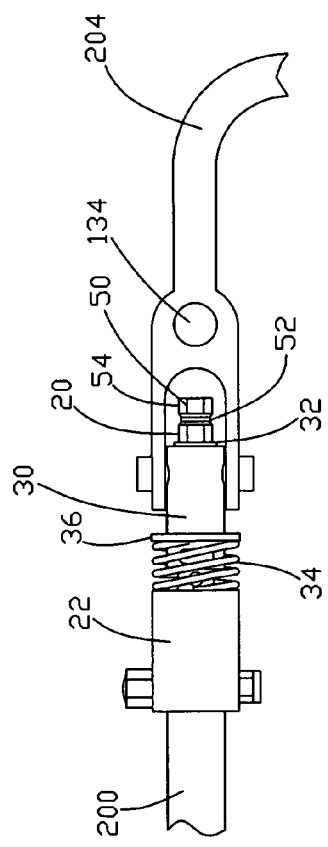
FIG. 6 illustrates a side view of a drive shaft connector according to an embodiment of the invention.
Figure 5:
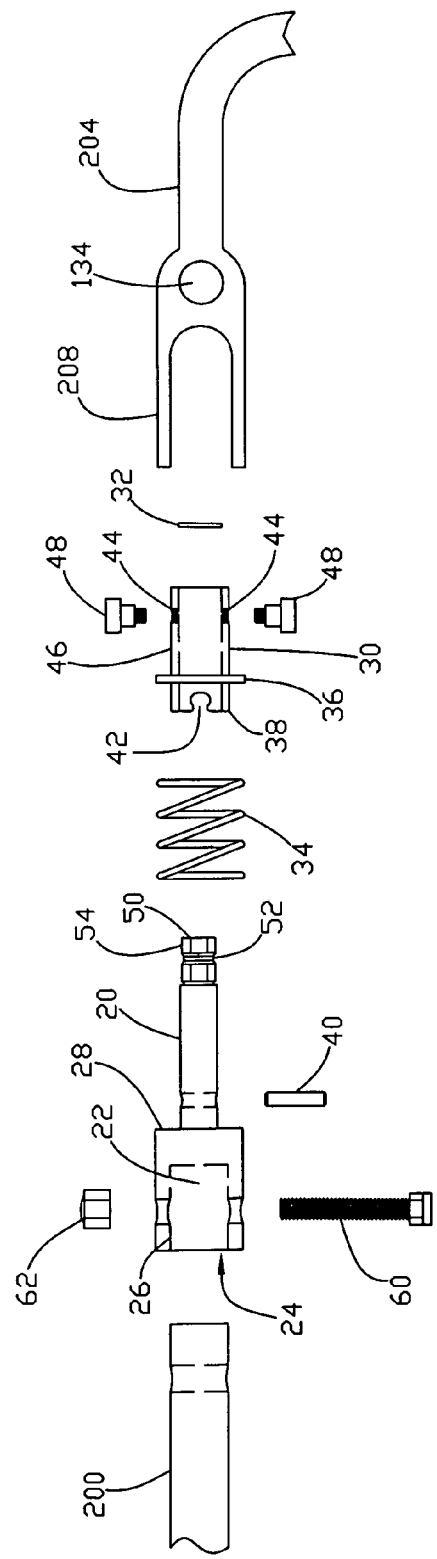
FIG. 5 illustrates an exploded side view of a drive shaft connector according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 6, a trailer landing gear apparatus 10 may have a drive shaft connector 12 attachable to a trailer drive shaft 200 or to a gear box (not shown) with a bolt 60 and nut 62 of a trailer landing gear mechanism. A drive gear apparatus 14 may be attached or engaged with a rotary drive apparatus 202 and a drive apparatus connector 16 may be attached to a drive socket 18 of the drive gear apparatus 14. To rotate the drive shaft 200 the drive apparatus connector 16 may be positioned on a connector shaft 20 of the drive shaft connector 12, as best viewed in FIGS. 10 and 11. The rotary drive apparatus 202 may then be operated to rotate the elements of the drive gear apparatus 14 to rotate the engaged drive apparatus connector 16 and drive shaft connector 12 thereby rotating the landing gear drive shaft 200. There may be a speed control 142 and drive switch 144 to operate the apparatus 202.

The drive shaft connector 12 may have a connector socket 22 of generally cylindrical form with an open end 24 for receipt of a trailer landing gear drive shaft 200 in a cavity 26. The connector shaft 20 may be attached axially on the closed end 28 of the connector socket 22. An engagement sleeve 30 may be slidably positioned on the connector shaft 20 and retained by a retaining clip 32. A spring 34 may be positioned about the connector shaft 20 between the closed end 28 and a flange 36 attached to the sleeve 30 to bias the sleeve 30 away from the closed end 28. The connector shaft 20 may have a pin 40 attached to extend laterally adjacent to the closed end 28 and the sleeve 30 may have two slots 42 in the slot end 38 adjacent to the closed end 28. With the connector socket 22 attached, for example, by a bolt 60, to the drive shaft 200, when a force is applied to the sleeve 30 to compress spring 34 the slots 42 may be forced over the pin 40 such that if the sleeve 30 is rotated, the entire drive shaft connector 12 is rotated thereby rotating the drive shaft 200. The sleeve 30 may have two threaded holes 44 in the sidewall 46 for attachment of shoulder screws 48 that may be used for rotatable attachment of a hand crank handle 204. The connector shaft 20 may have an annular groove 52 adjacent to the head end 50. The head end 50 may have a polygon or spline form on the circumferential surface 54, for example, a hexagonal form similar to a bolt head or nut shape may be used.

The drive gear apparatus 14 may have a two part housing 70 with a main body 72 and a cover 74 that may be fastened by screws 116 There may be a primary drive gear 76 for attachment to the drive socket 18 and a secondary drive gear 78 for engagement with a rotary shaft 206 of the rotary drive apparatus 202. A cavity 80 may be formed in the housing 70 with a first portion 82 formed in the cover 74 and a second portion 84 formed in the main body 72, as best viewed in FIGS. 3 and 4. The primary gear 76 may have the drive socket 18 attached at a first surface 90 and the drive socket 18 and primary gear 76 may be positioned in first portion 82 of the cover 74 with the drive socket 18 drive cavity end 92 extending outwardly from the cover 74 through an opening 94. A drive bushing 96 may be positioned on the drive socket 18 to engage a bushing recess 98 in the cover 74.

The secondary drive gear 78 may be retained in the housing 80 by a gear pin 100 with an end in a pin recess 102 in the cover 74 and a pin recess 104 in the main body 72. The secondary gear 78 has a first gear element 106 and a second gear element 108 axially aligned for the first ear element 106 to engage the gear teeth 110 of the primary gear 76 and the second gear element 108 to be engaged by the rotary shaft 206. The overall gear rotation for the combination of gears and rotary shaft 206 may be a 10 to 1 ratio to allow a drill motor as an example to rotate a drive shaft 200 of a trailer landing gear system. The cavity end 92 may have a socket cavity that has polygonal faces or spline teeth to engage the head end 50 of the connector shaft 20.

The drive apparatus connector 16 attached to the drive socket 18 extending out of the cover 74 may be attached by an inner tubular body 120 to the drive socket 18 and retained by a set screw 118. The inner tubular body 120 may be slidably inserted in an outer tubular body 122 and a spring 124 may be positioned between bodies 120, 122 to bias them apart. A connector ring 126 may be retained in the outer tubular body 122 in position to engage the annular groove 52 of the connector shaft 20 when the drive apparatus connector 16 may be pushed over the shaft 20. The drive socket 18 may then be forced to engage the head end 50 against the force of the spring 124. The drive apparatus connector may provide a safety disengagement action of the drive gear apparatus 14 and rotary drive apparatus 202 in the event of an out of tolerance force requirement to drive the drive shaft 200.

Referring to FIGS. 1 through 9, the drive gear apparatus 14 housing 70 may have a stabilizer mount 130 with a stabilizer 132 for use as a leverage device to control rotation torque when operating the rotary drive apparatus 202. The stabilizer 132 may be inserted in a stabilizer aperture 134 in the hand crank handle 204, as best viewed in FIGS. 10 and 11. There may be a hand crank fastener 136 attached to structure adjacent the trailer landing gear to retain the crank handle 204. There may be a handle 140 attached to the housing 70.

Figure 10:
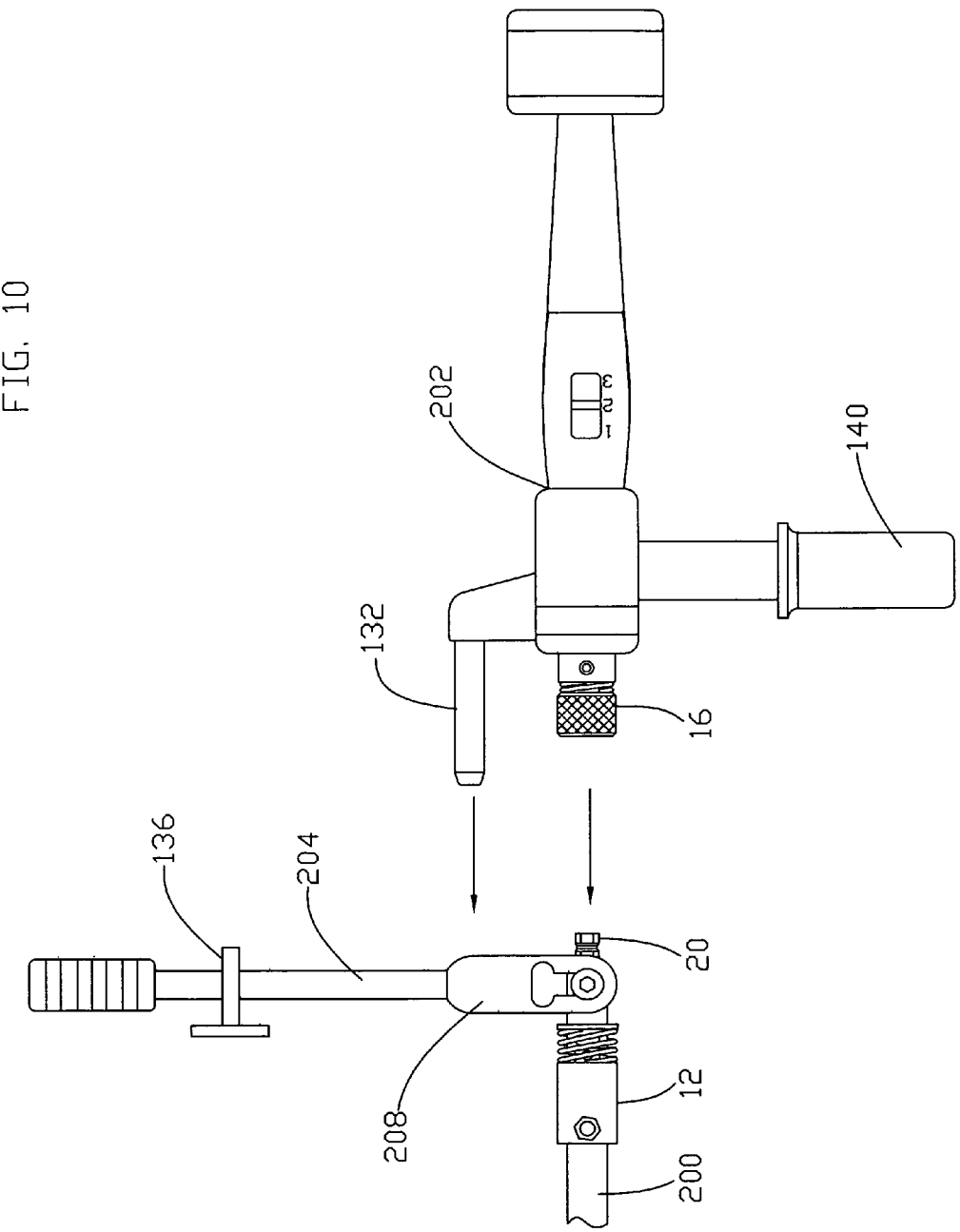
FIG. 10 illustrates a side view of a rotary drive apparatus disconnected from a drive shaft connector according to an embodiment of the invention.
Figure 11:
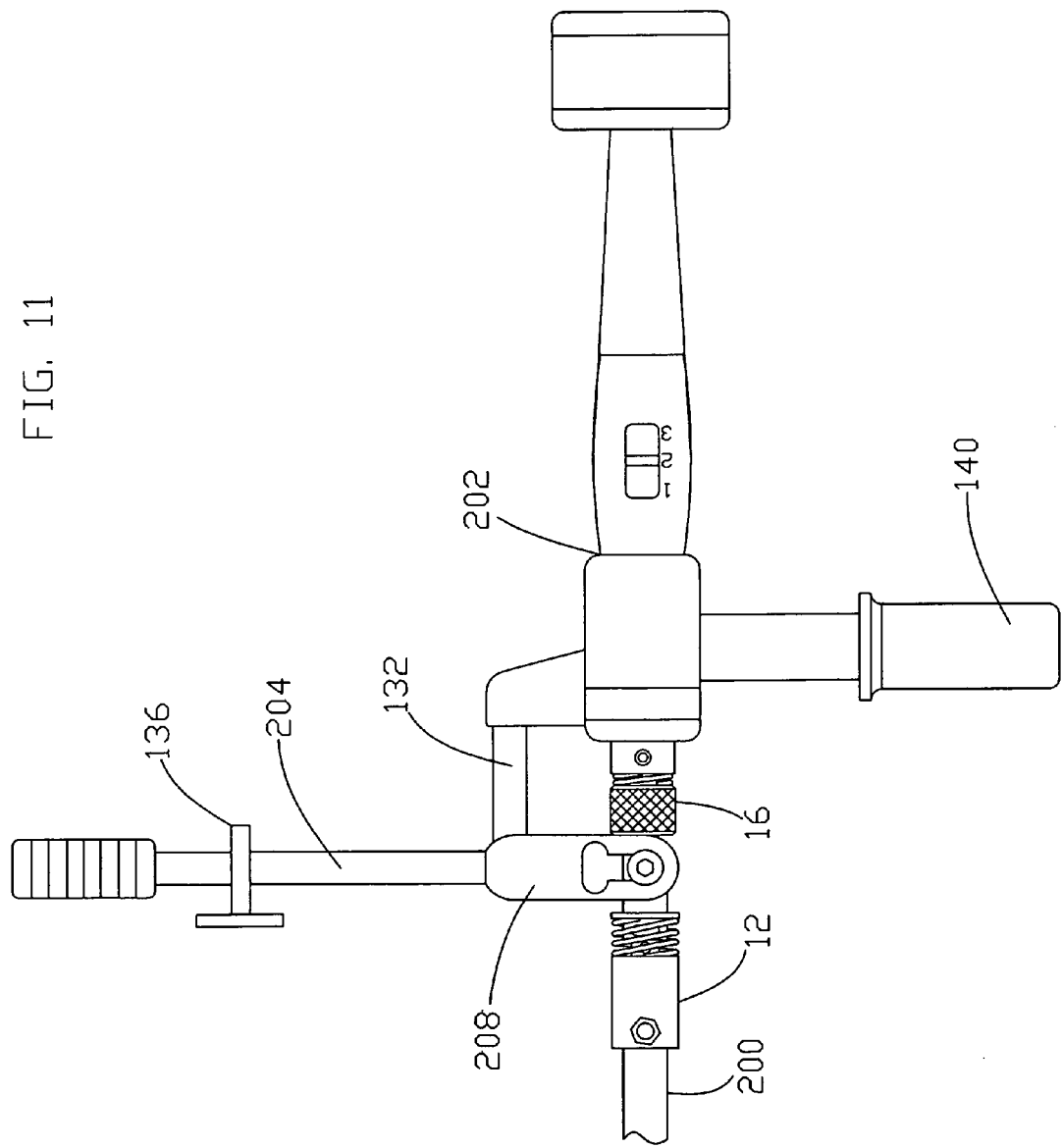
FIG. 11 illustrates a side view of a rotary drive apparatus connected to a drive shaft connector according to an embodiment of the invention.
Figure 12:
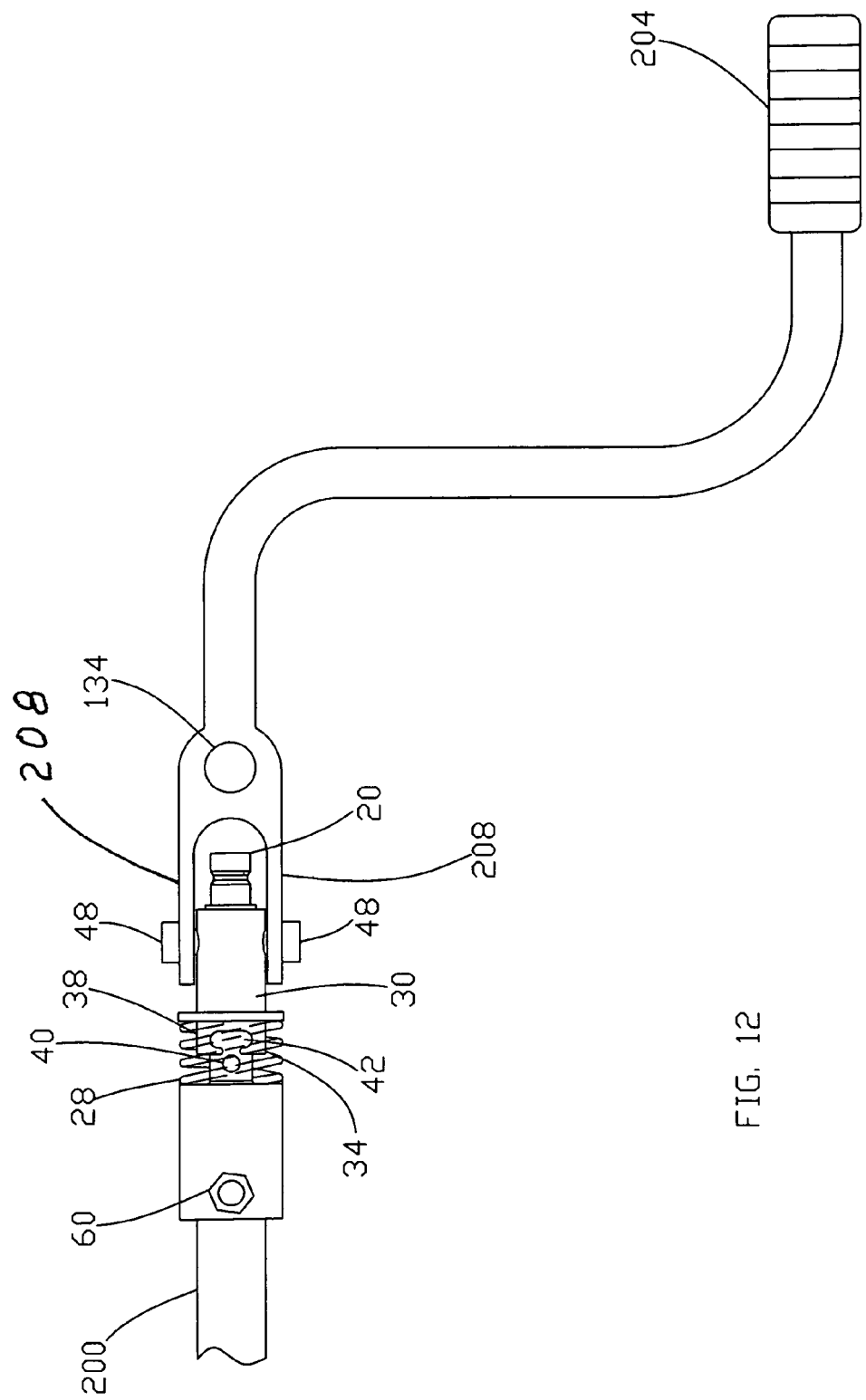
FIG. 12 illustrates a side view of a hand crank handle positioned on a drive shaft connector for rotating a drive shaft according to an embodiment of the invention.

Referring to FIGS. 10 through 12, the hand crank handle 204 may be attached to the engagement sleeve 30 of the drive shaft connector 12. The attachment may be a rotatable attachment of a pair of crank handle forks 208 to the shoulder screws 48 to allow positioning the handle 204 rotated away from the axis of the connector shaft 20 to allow engagement of a rotary drive apparatus 202. The handle 204 may also be rotated about shoulder screws 48 to be positioned for use in rotating the drive shaft 200, as best viewed in FIG. 12. When the engagement sleeve 30 may be forced against spring 34 separation bias to position the slot end 38 against the closed end 28 to engage slots 42 with the pin 40, rotation of handle 204 may cause the drive shaft connector 12 and drive shaft 200 to rotate.

While the invention has been particularly shown and described with respect to the illustrated embodiments thereof, it will be understood by those skilled in the art that the foregoing and other changes in form and details may be made therein without departing from the spirit and scope of the invention.

We claim:

1. An apparatus for rotating a drive shaft of a landing gear or a lifting gear of a land vehicle comprising;
 a drive shaft connector with a connector socket having a cavity socket with an open end and a closed opposite end with a connector shaft attached axially to said closed end attachable to a drive shaft;
 an engagement sleeve is slidably disposed on said connector shaft and retained by a retaining clip attached to said connector shaft;
 a spring is positioned about said connector shaft between said closed end and a flange attached to said engagement sleeve and is biased to urge said engagement sleeve away from said closed end;
 a pin is attached to said connector shaft to extend laterally adjacent said closed end and said engagement sleeve has two opposed slots in a slot end of said engagement sleeve disposed to engage said pin when a force is applied to said engagement sleeve to compress said spring;
 said engagement sleeve has two opposed threaded apertures in a sidewall with a shoulder screw threaded into each disposed for rotatable attachment of a hand crank handle having a stabilizer aperture disposed therein;
 a stabilizer mount is attached to a housing and has a stabilizer attached to project outwardly for insertion in said stabilizer aperture when said hand crank is positioned approximately orthogonal to a drive axis of a drive gear apparatus;
 a drive socket at a drive socket end is engaged with a head end of said connector shaft and said drive socket is attached at an end opposite to a first surface of a primary drive gear disposed and inserted through an opening in said housing to extend outwardly from said housing;
 said housing having a cavity with said primary drive gear and a secondary drive gear disposed therein for a plurality of gear teeth of said primary drive gear to engage a first gear element of said secondary drive gear; and
 a second gear element of said secondary drive gear is disposed in said housing to be engaged by a rotary shaft of a rotary drive apparatus when the rotary shaft is inserted in said housing.

2. The apparatus as in claim 1 wherein said connector shaft has an annular groove disposed adjacent said head end of said connector shaft and said head end has a polygon form on the circumferential surface.

3. The apparatus as in claim 1 wherein said primary drive gear, said secondary drive gear and the rotary shaft have a gear ratio of approximately 10 to 1.

4. The apparatus as in claim 1 wherein a driving bushing is disposed on said drive socket and inserted in a bushing recess in said housing.

5. The apparatus as in claim 1 wherein a hand crank fastener for attaching to a structure of said land vehicle is disposed approximately orthogonal to the drive axis of said drive gear apparatus.

6. The apparatus as in claim 1 wherein a handle is attached to said housing.

* * * * *